US006557822B1

(12) United States Patent
Yoshino

(10) Patent No.: US 6,557,822 B1
(45) Date of Patent: May 6, 2003

(54) DYNAMICALLY STABLE FLOW AMPLIFYING POPPET VALVE

(75) Inventor: Kazunori Yoshino, Hyogo Prefecture (JP)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/717,574

(22) Filed: Nov. 21, 2000

(51) Int. Cl.[7] ............................................ F16K 31/363

(52) U.S. Cl. ............................ 251/33; 251/48; 251/55; 137/625.61

(58) Field of Search ............................ 251/33, 48, 55; 137/625.61

(56) References Cited

U.S. PATENT DOCUMENTS

| | | | |
|---|---|---|---|
| 4,706,932 A | 11/1987 | Yoshida et al. | |
| 5,137,254 A | 8/1992 | Aardema et al. | |
| 5,170,692 A | 12/1992 | Lonnemo | |
| 5,253,672 A | 10/1993 | Uehara et al. | |
| 5,417,402 A | 5/1995 | Speybroeck | |
| 5,558,004 A | 9/1996 | Stellwagen | |
| 5,836,335 A | * 11/1998 | Harms et al. | 137/625.61 X |
| 5,873,561 A | 2/1999 | Bourkel et al. | |
| 6,038,957 A | 3/2000 | Ertmann et al. | |

FOREIGN PATENT DOCUMENTS

| | | |
|---|---|---|
| JP | 256418 | 9/1997 |

* cited by examiner

*Primary Examiner*—Kevin Lee
(74) *Attorney, Agent, or Firm*—Howard & Howard; Steven M. Hanley

(57) ABSTRACT

A flow amplifying poppet valve is useful in hydraulic circuits requiring low leakage when in a loaded condition. Undesirable pressure fluctuations effect the stability of the poppet. Tilting of the poppet valve within the bore increases friction that degrades repeatability. The subject invention provides a flow amplifying poppet valve that dampens valve oscillation caused by pressure fluctuations and provides for a constant guide length to prevent poppet valve tilting in the bore. The flow amplifying poppet valve assembly comprises a poppet valve slidably disposed within a bore that includes a poppet seat for engaging the valve seat to meter the flow of fluid between the inlet and the outlet. The poppet valve and bore have radially overlapping shoulders movable axially toward and away from each other to define a pressure chamber that accumulates fluid for dampening poppet valve oscillation.

19 Claims, 5 Drawing Sheets

DYNAMICALLY STABLE FLOW AMPLIFYING POPPET VALVE

TECHNICAL FIELD

This invention relates generally to a poppet valve for metering the flow of fluid and more specifically to a flow amplifying poppet valve.

BACKGROUND ART

A poppet is a common type of low leakage, flow amplifying hydraulic control valve. A type of low leakage poppet valve is described in U.S. Pat. No. 5,137,254 and includes a cylindrical poppet valve having a poppet seat sealing against a valve seat. Fluid flow is metered between an inlet and outlet port by controllably moving the poppet valve off the valve seat.

The poppet valve includes slots to establish fluid communication between the inlet and a control chamber disposed behind the poppet valve and opposite the outlet. The fluid pressure in the control chamber exerts a closing force on the poppet valve holding it against the valve seat. A spring holds the poppet valve against the valve seat when pressure in the inlet, control chamber and outlet are equal. Adjusting fluid flow from the control chamber to the outlet varies pressure in the control chamber. A pilot valve having a variable regulating orifice controls fluid flow out of the control chamber.

The variable regulating orifice is normally closed so that fluid pressure in the control chamber equals the inlet pressure thereby urging the poppet valve against the valve seat. Opening of the pilot valve reduces pressure in the control chamber to urge the poppet valve off the valve seat when the pressure in the control chamber drops below a balance pressure. Controlling the flow through the variable regulating orifice of the pilot valve subsequently controls the degree of opening of the valve element.

A guide extension extending from the poppet seat guides along the inner diameter of the outlet. The guide extension maintains axial alignment of the poppet seat to the valve seat. The guide extension is necessary because incoming fluid flow through the inlet creates a moment force tending to tilt the poppet valve. Tilting of the poppet valve within the bore causes friction between the poppet valve and the bore inner diameter. Friction between the poppet valve and the bore inner diameter causes a great deal of unpredictability in the control of the valve.

The guide extension on the poppet seat eliminates much of the undesirable unpredictability by preventing tilting of the valve in the bore. However, as the valve opens the guide extension is pulled out of the inlet leaving progressively less of the guide extension to prevent tilting of the poppet valve. Further, in a fully open position, the guide extension is completely clear of the outlet, and provides no resistance to tilting.

An additional problem encountered in the control of a poppet valve is oscillation. Fluctuations in fluid pressure or fluid flow cause the poppet valve to oscillate. An oscillating poppet valve creates an oscillating fluid flow or fluid pressure at the outlet and is therefore undesirable.

For these reasons, a poppet valve configuration capable of reducing the effects of pressure fluctuations, and capable of preventing poppet valve tilting is needed.

The present invention is directed to overcome one or more of the problems as set forth above.

DISCLOSURE OF THE INVENTION

In one aspect of the invention, a flow amplifying poppet valve assembly for metering fluid flow is disclosed. The valve assembly comprises a housing defining a bore and including an inlet and an outlet presenting a valve seat. A poppet valve is slidably disposed within the bore and includes a poppet seat for engaging the valve seat to meter the flow of fluid between the inlet and the outlet. The poppet valve and housing have radially overlapping shoulders movable axially toward and away from each other to define a pressure chamber that accumulates fluid for dampening poppet valve oscillation.

The subject invention overcomes the deficiencies of prior art flow amplifying poppet valves by including a pressure chamber defined by overlapping shoulders on the poppet valve and the housing. The pressure chamber reduces the effects of pressure and fluid flow fluctuations on poppet valve position. Further, the overlapping shoulders create a constant guide length over the entire range of movement of the poppet valve thereby preventing poppet valve tilting.

BRIEF DESCRIPTION OF THE DRAWINGS

Other advantages of the present invention will be readily appreciated as the same becomes better understood by reference to the following detailed description when considered in connection with the accompanying drawings wherein.

BEST MODE FOR CARRYING OUT THE INVENTION

Figure 1:
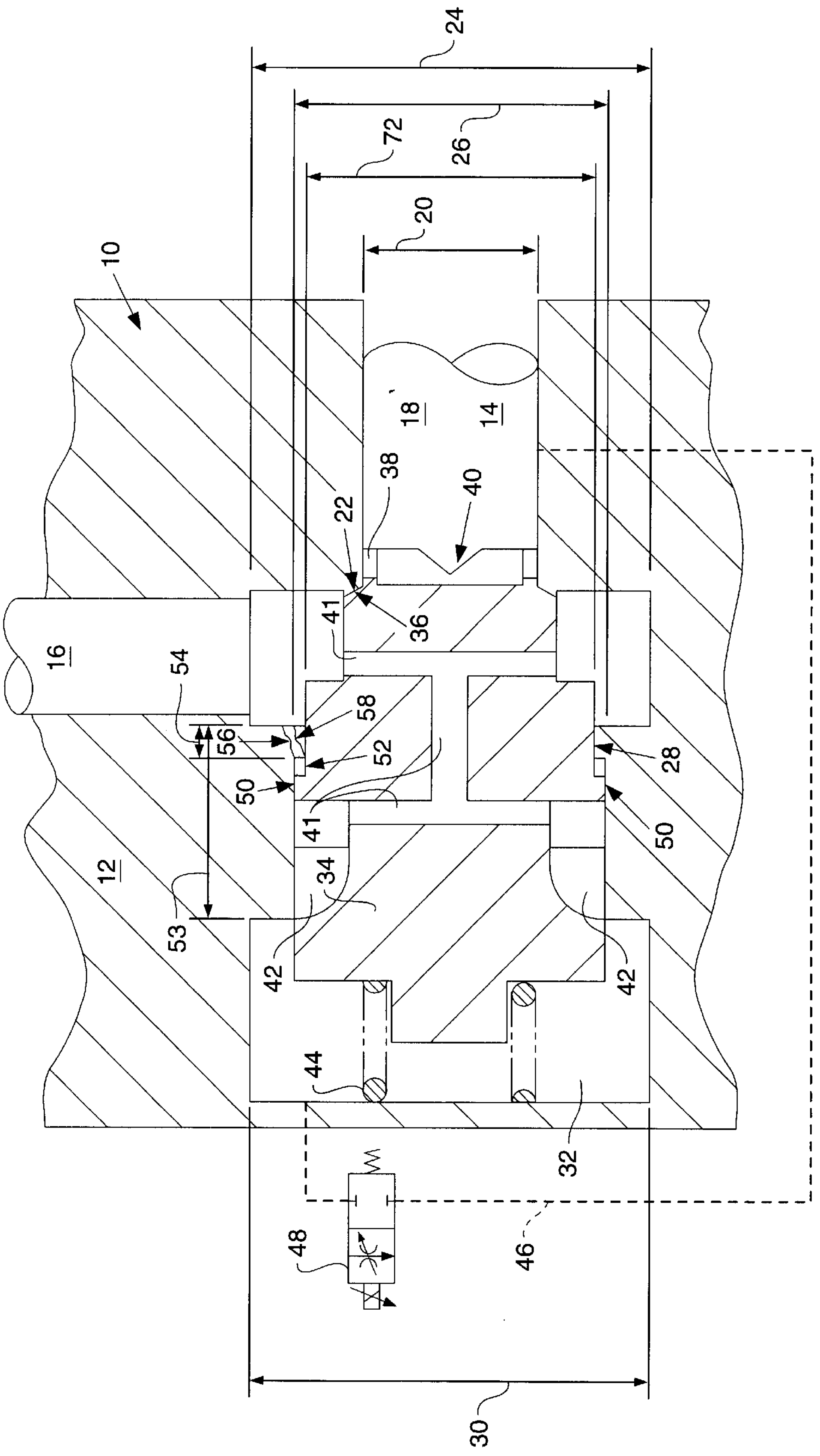
FIG. 1 is a cross-sectional schematic view of a first embodiment of the valve assembly.

Referring to the Figures, wherein like numerals indicate like or corresponding parts throughout the several views, a dynamically stable flow amplifying poppet valve assembly for metering fluid flow is generally shown at 10. Referring to FIG. 1, the valve assembly 10 includes a housing 12 defining a bore 14 and including an inlet 16 and an outlet 18. The outlet 18 has a first inner diameter 20 that defines a valve seat 22. A second inner diameter 24 of the bore 14 intersects the inlet 16. A third inner diameter 26 of the bore 14 cooperates with the second inner diameter 24 to define a housing shoulder 28. The housing shoulder 28 projects radially into the bore 14. A fourth inner diameter 30 arranged opposite the outlet 18 defines a control chamber 32.

A poppet valve 34 is slidably disposed within the bore 14 and includes a poppet seat 36 engaging the valve seat 22. The poppet valve 34 meters the flow of fluid between the inlet 16 and the outlet 18. A guide extension 38 extends from the poppet seat 36 into the first inner diameter 20 of the outlet 18. The guide extension 38 includes a plurality of V-shaped cross-slots 40. These V-shaped cross-slots 40 might be replaced with a plurality of drilled holes and/or U-shaped cross-slots.

The poppet valve 34 is preferably constructed of a steel alloy. As appreciated, the material selected for construction of the poppet valve requires favorable wear properties to provide favorable durability characteristics. It should be understood that it is within the contemplation of this invention that the poppet valve may comprise any material known by those knowledgeable in the art.

The poppet valve 34 includes internal passages 41. The poppet valve 34 also includes slots 42 disposed about the periphery thereof. The internal passages 41 establish fluid communication between the inlet 16 and slots 42. The slots 42 establish fluid communication between the inlet 16 and the control chamber 32 through the internal passages 41. A spring 44 is disposed in the control chamber 32 to urge the poppet valve 34 against the valve seat 22. A flow regulating passage 46 communicates the control chamber 32 with the outlet 18. A pilot valve 48 having a variable orifice controls fluid flow from the control chamber 32 to the outlet 18.

The poppet valve 34 and housing 12 have radially overlapping shoulders 50,28 movable axially toward and away from each other that define a pressure chamber 52 to accumulate fluid for dampening poppet valve oscillation. The poppet valve has a diameter 72 that guides along the housing shoulder 28. The housing shoulder 28 extends into the bore 14 and contacts the poppet valve 34. The housing 12 has a guide length 53. The shoulder 28 has an axial length 54. The guide length 53 maintains guiding contact with the poppet valve 34 through the entire range of possible poppet valve 34 movement.

The housing 12 includes a first fluid passage 56 to establish fluid communication between the inlet 16 and the pressure chamber 52. A damper orifice 58 positioned within the first fluid passage 56 restricts fluid flow between the pressure chamber 52 and the inlet 16. Restricting fluid flow into and out of the pressure chamber 52 smoothes poppet valve 34 movement by dampening oscillation caused by pressure and fluid flow fluctuations.

Figure 2:
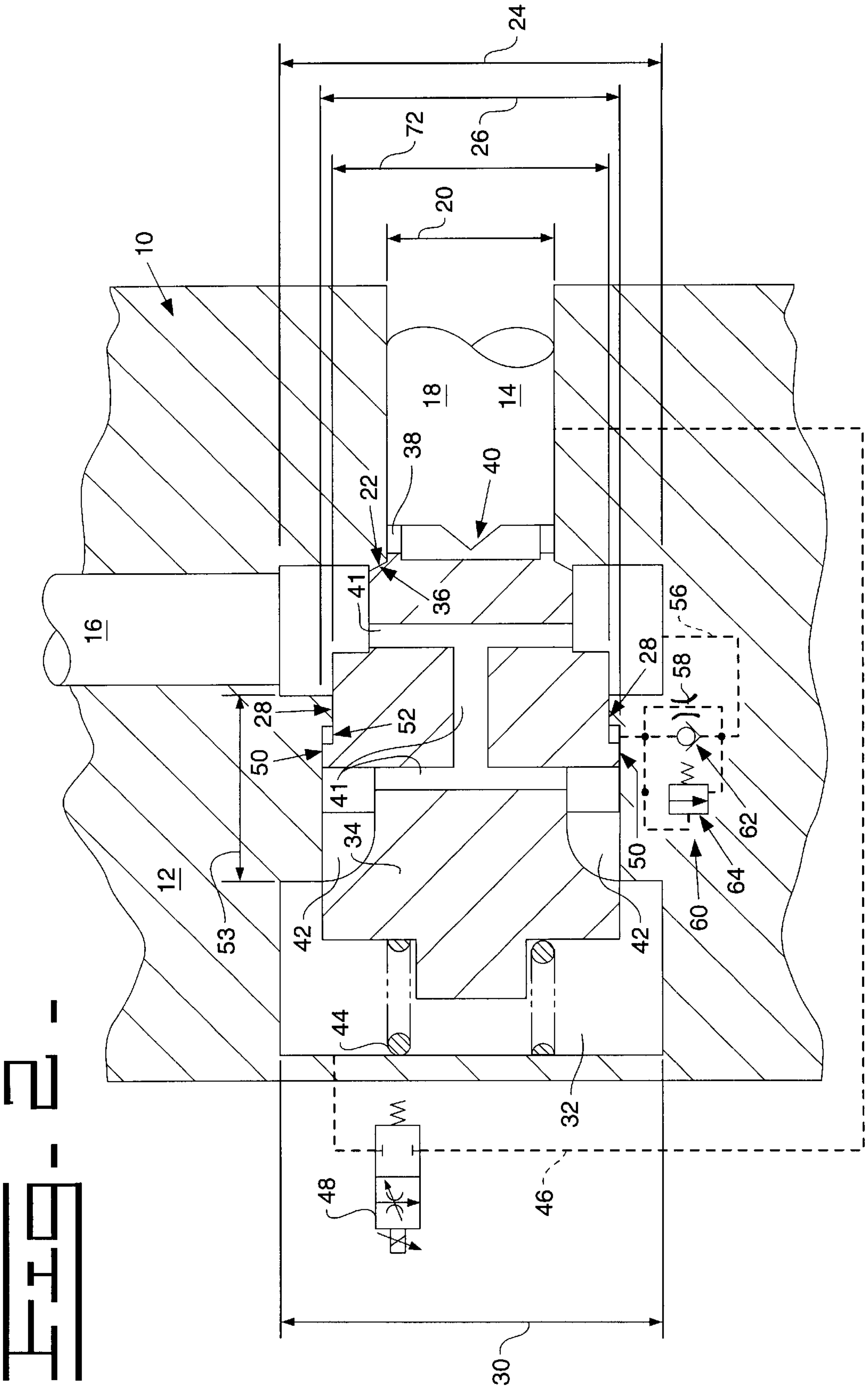
FIG. 2 is a cross-sectional schematic view of a second embodiment of the valve assembly.

In a second embodiment of the subject invention shown in FIG. 2, the first fluid passage 56 is not machined as a direct passage between the pressure chamber 52 and the inlet 16. The housing 12 is configured to establish communication between the inlet 16 and pressure chamber 52 through a second valve assembly 60 including the damper orifice 58, a check valve 62 and a pressure relief valve 64 arranged in parallel. As is appreciated, the second valve assembly 60 may be disposed within the housing 12 or in a secondary housing. The check valve 62 allows fluid to freely enter the pressure chamber 52, thereby bypassing the damper orifice 58. The pressure relief valve 64 provides for the venting of abnormally high pressure out of the pressure chamber 52. The pressure relief valve 64 may be of any type known in the art.

Figure 3:
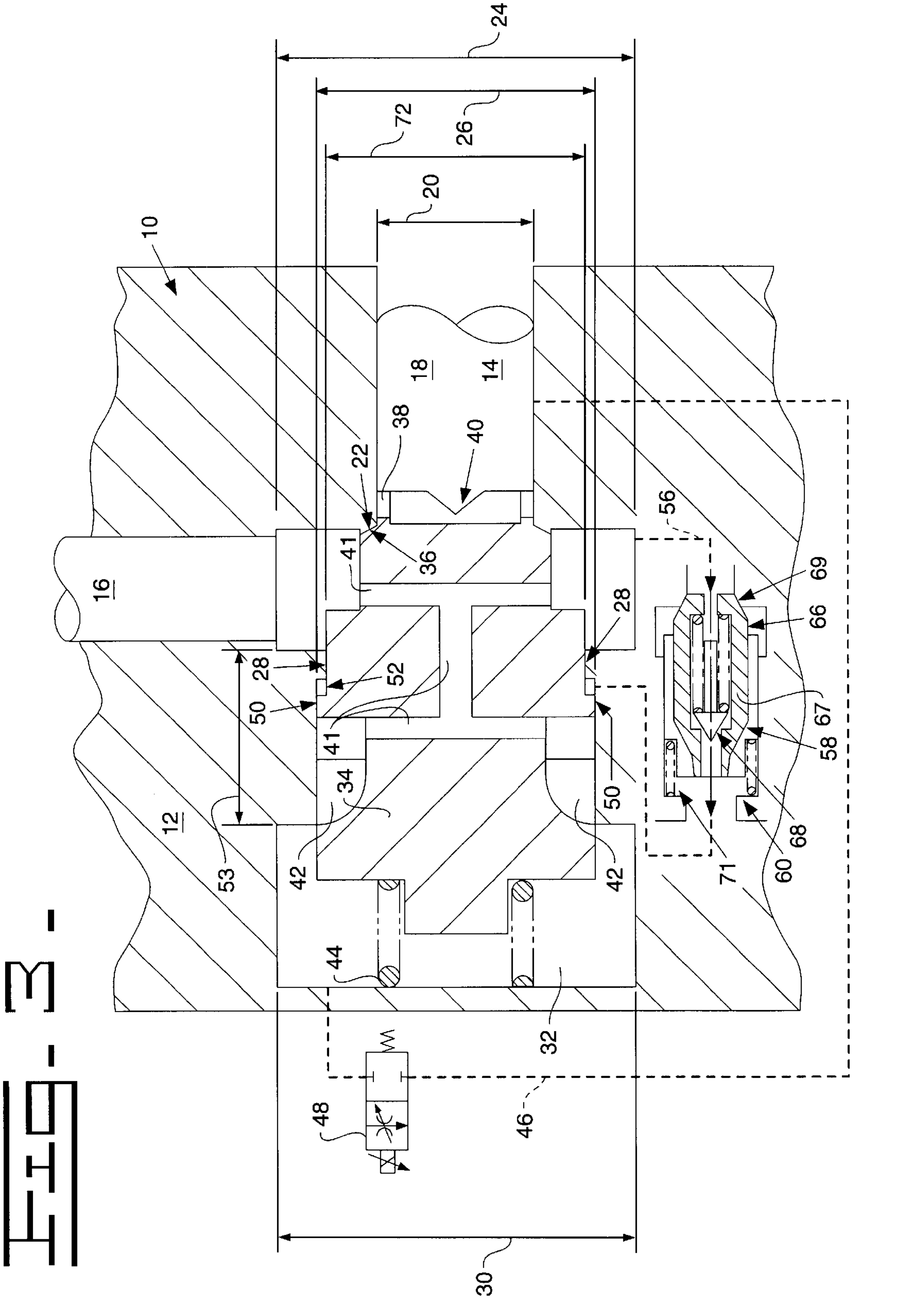
FIG. 3 is a cross-sectional schematic view of a third embodiment of the valve assembly.

In a third embodiment shown in FIG. 3, the second valve assembly includes a poppet type check valve 66. The poppet type check valve is disposed within a valve assembly body 67. The valve assembly body 67 seals against a valve assembly body seat 69. A spring 71 urges the valve assembly body against the body seat 69. The damper orifice 58 in the third embodiment is disposed within the valve assembly body 67 to provide the flow of a fluid into and out of the pressure chamber 52 under normal operation. A pressure relief valve 68 built into the poppet type check valve 66 vents abnormally high-pressure fluid out of the pressure chamber 52. The valve assembly body 67 allows fluid flow from the inlet 16 to pass through the poppet type check valve 66 and the orifice 58 to enter the pressure chamber 52.

Figure 4:
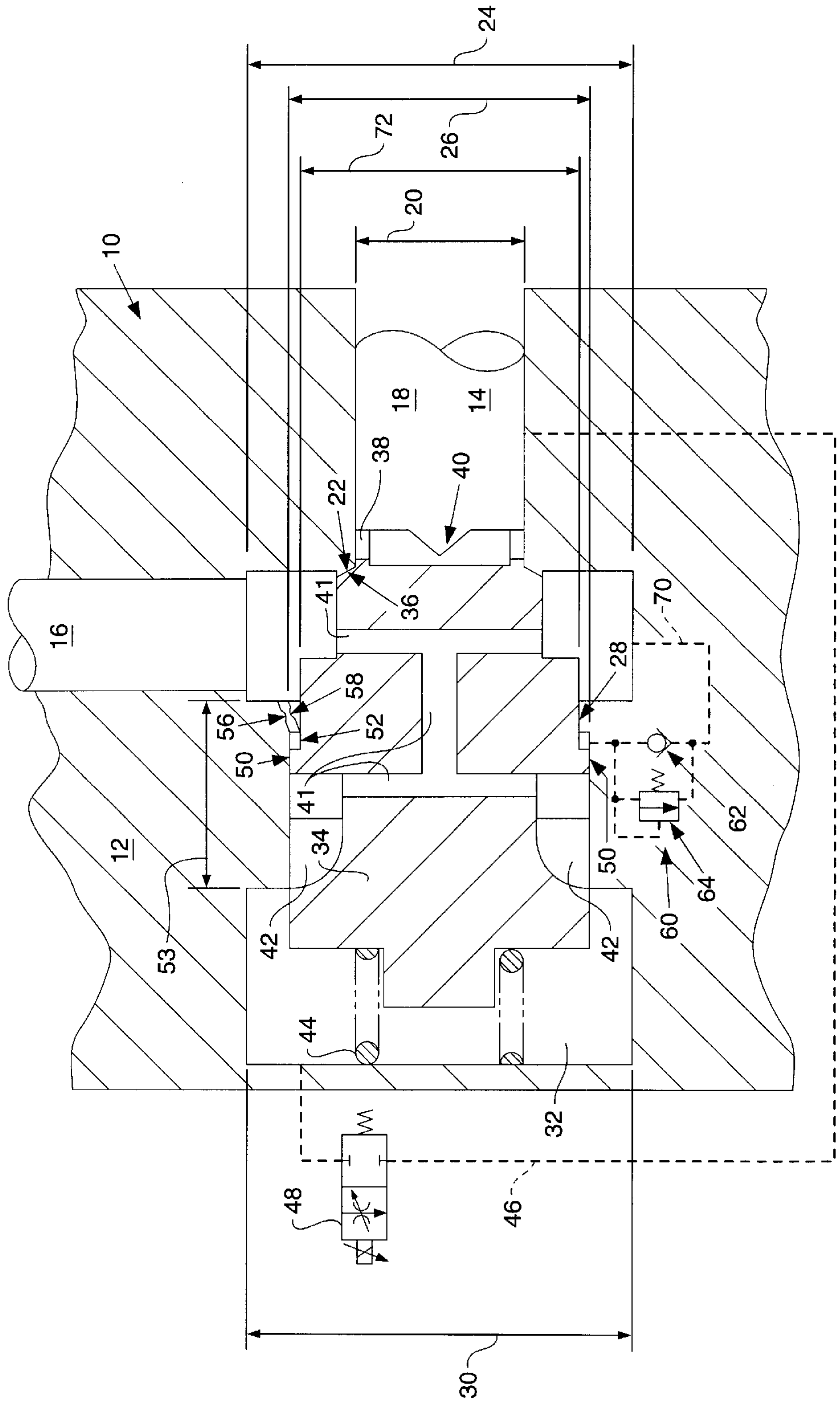
FIG. 4 is a cross-sectional schematic view of a fourth embodiment of the valve assembly.

In a fourth embodiment of the subject invention shown in FIG. 4, the second valve assembly 60 communicates as a second fluid passage 70 between the inlet 16 and the pressure chamber 52. The first fluid passage 56 remains machined in the housing 12 as a direct path between the pressure chamber 52 and the inlet 16. The valve assembly 60 is disposed within the second fluid passage 70. As appreciated, the second fluid passage 70 and the second valve assembly 60 may be disposed separate from the housing 12. The second fluid passage 70 and second valve assembly 60 include the same check valve 62 and the pressure relief valve 64 arranged within the second fluid passage 56 as shown in FIG. 2. However, in the fourth embodiment the damper orifice 58 is disposed in the first fluid passage 56.

Figure 5:
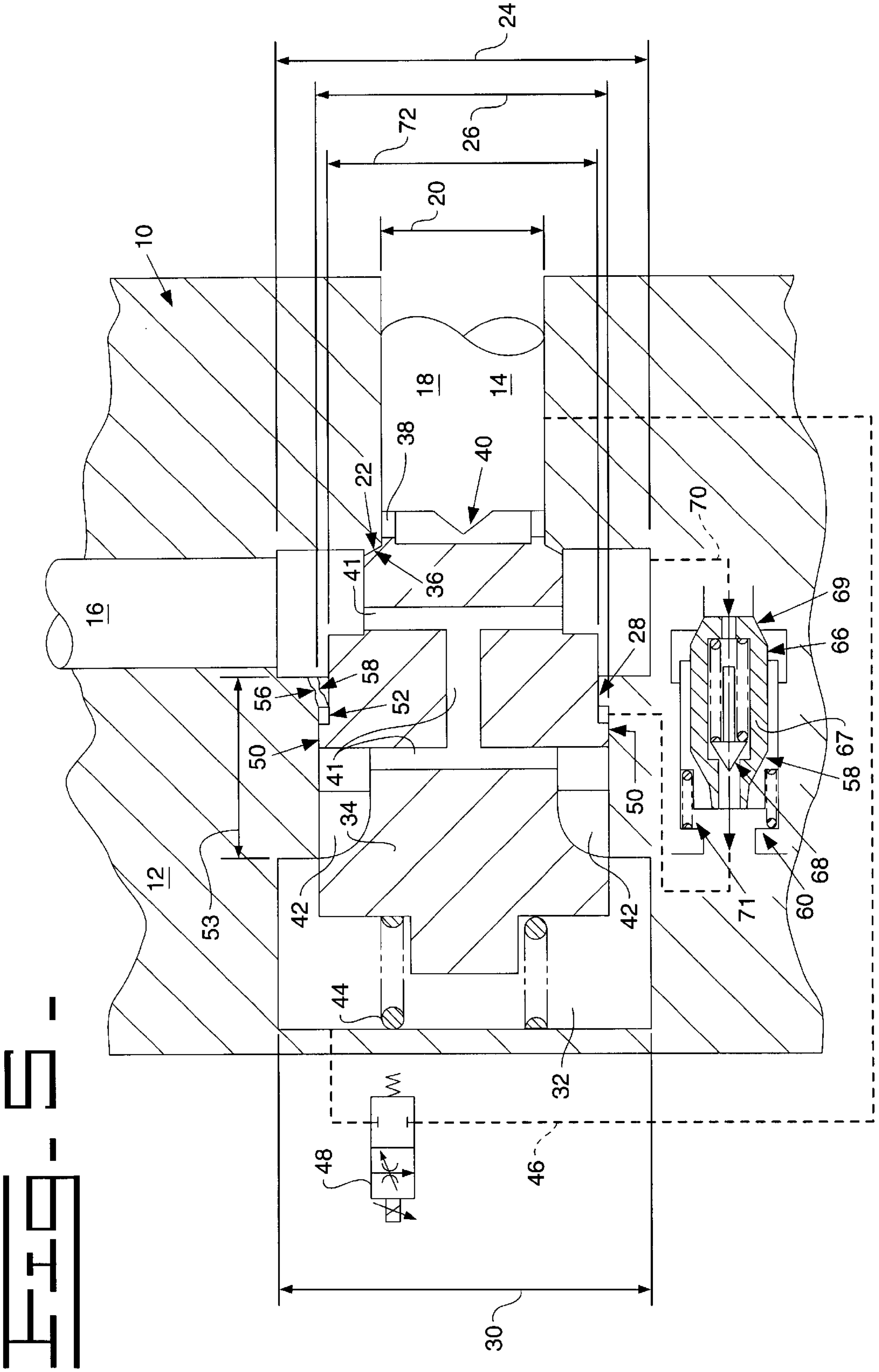
FIG. 5 is a cross-sectional schematic view of a fifth embodiment of the valve assembly.

In a fifth embodiment of the subject invention shown in FIG. 5, the second valve assembly 60 communicates as a second fluid passage 70 between the inlet 16 and the pressure chamber 52. The first fluid passage 56 remains machined in the housing 12 as a direct path between the pressure chamber 52 and the inlet 16. The second fluid passage 70 and second valve assembly 60 include the poppet type check valve 66 with the built in pressure relief valve 68. In this embodiment, the damper orifice 58 is disposed in the first fluid passage 56 as in the first embodiment shown in FIG. 1.

INDUSTRIAL APPLICABILITY

With respect to the embodiment shown in FIG. 1, when the pilot valve 48 is closed fluid from the inlet 16 proceeds though the internal passages 41 and peripheral slots 42 of the poppet valve 34 to fill the control chamber 32. Because the pilot valve 48 is closed, the fluid pressure within the control chamber 32 is equal to the fluid pressure at the inlet 16. Fluid pressure from the inlet 16 acts within the control chamber 32 on the poppet valve 34 to hold the poppet seat 36 against the valve seat 22. When a differential fluid pressure between the inlet 16 and the outlet 18 is less than the force of the spring 44, the spring 44 will urge the poppet valve 34 closed against the valve seat 22.

To move the poppet valve 34 off the valve seat 22 the pilot valve 48 is opened to allow flow out of the control chamber 32. The accompanying pressure drop between the inlet 16 and the control chamber 32 causes a pressure imbalance that moves the poppet valve 34 from the valve seat 22. The amount that the poppet valve 34 lifts from the valve seat 22 is nearly proportional to the amount of fluid flow out of the control chamber 32 and the magnitude of the pressure drop between the inlet 16 and the control chamber 32.

A guide extension 38 extends from the poppet seat 36 into the outlet 18 to axially align the poppet seat 36 with the valve seat 22. The V-shaped or U-shaped cross-slots 40 of the guide extension 38 provide a fluid flow path from the inlet 16 to the outlet 18. As the poppet valve 34 lifts off the valve seat 22 fluid flow begins to flow through the slots 40. As the poppet valve is progressively lifted from the valve seat 22 an increasing amount of the slots 40 are uncovered allowing proportionally more fluid flow.

Moving the poppet seat 36 off the valve seat 22 progressively shortens the amount of the guide extension 38 extending into the outlet 18. Smooth poppet valve 34 travel is obtained by maintaining a constant ratio (L/D) between the guide length 53 and the poppet diameter 26. A constant L/D ratio reduces excessive friction caused by tilting of the poppet valve 34. If the guide extension 38 were the only guide for the poppet valve 34, once clear of the outlet 18, the effective L/D ratio would be negligible. The poppet valve 34 would tilt because of flow forces from the flow of the fluid between the inlet 16 and outlet 18. The poppet valve 34 tilt causes contact with the inner diameter of the bore 14, thereby creating friction that degrades the smooth movement and repeatability of the poppet valve 34.

Tilting of the poppet valve 34 is prevented in the subject invention by the guide length 53 of the bore contacting the poppet valve 34. The guide length 53 guides the poppet valve 34 through the entire range of poppet valve 34 movement. The guide length 53 maintains a constant sliding contact between with the poppet valve 34, thereby maintaining a constant L/D ratio.

The pressure chamber 52 is defined by radially overlapping shoulders 28,50 of the housing 12 and the poppet valve 34 and fills with fluid to act as a damper to prevent oscillation of the poppet valve 34. The fluid passage 56 establishes communication between the pressure chamber 52 and the inlet 16. The damper orifice 58 in the first fluid passage 56 restricts the flow of fluid into and out of the pressure chamber 52 to dampening oscillations of the poppet valve 34.

Referring to the embodiment of FIG. 2, when the poppet valve 34 opens suddenly the pressure chamber size increases and more fluid is drawn into the pressure chamber 52 from the inlet 16. However, the damper orifice 58 will restrict the flow of fluid into the pressure chamber 52, creating a vacuum in the pressure chamber 52 that causes the poppet valve 34 to hesitate. The subject invention provides a check valve 62 to correct this problem. The check valve 62 is arranged to allow fluid to enter the pressure chamber 52, but not exit. Therefore, when the poppet valve 34 opens suddenly the check valve 62 provides a second unrestricted passage for fluid to flow into the pressure chamber 52. The unrestricted passage through the check valve 62 allows fluid to freely enter the pressure chamber 52 as quickly as the volume of the pressure chamber increases thereby, eliminating the vacuum in the pressure chamber 52, and preventing poppet hesitation.

Suddenly closing the poppet valve 34 may create a sudden abnormally high pressure in the pressure chamber 52, caused by the restriction of fluid through the damper orifice 58. High fluid pressure in the pressure chamber 52 causes the poppet valve 34 to hesitate when moving toward a closed position. The subject invention eliminates abnormally high pressure in the pressure chamber 52 with the pressure relief valve 64 arranged in parallel with the check valve 62. High pressure in the pressure chamber 52 caused by the sudden closing of the poppet valve 34 vents from the pressure chamber 52 through the pressure relief valve 64 and into the inlet 16. Abnormally high fluid pressure is routed around the restrictive damper orifice 58 to prevent poppet valve 34 hesitation.

Referring to the embodiment shown in FIG. 3, the second valve assembly 60 comprises the poppet type check valve 66. The damper orifice 58 is integrated into the valve assembly body 67 for the poppet type check valve 66. The poppet type check valve 66 allows fluid to flow freely between the pressure chamber 52 and the inlet 16. A relief valve 68 built into the poppet check valve 66 vents abnormally high pressure from the pressure chamber 52. Vacuum created by suddenly opening the poppet valve is eliminated by the valve assembly body 67. The valve assembly body 67 will lift off the body seat 69 to allow unrestricted flow of fluid into the pressure chamber 52, thereby preventing hesitation of the poppet valve 34.

Referring to the embodiments shown in FIGS. 4 and 5, a second fluid passage 70 including the second valve assembly 60, between the inlet 16 and the pressure chamber 52 is provided. Referring specifically to FIG. 4, the check valve 62 and the pressure relief valve 64 are arranged in parallel. In this embodiment, the damper orifice 58 is disposed in the first fluid passage 56 separate from the second valve assembly 60.

Referring to FIG. 5, the fifth embodiment of the subject invention substitutes a poppet type check valve 66 disposed within a valve assembly body 67 as the second valve assembly 60. A pressure relief valve 68 is built into the poppet type check valve. The damper orifice 58 is disposed in the first fluid passage 56 separate from the poppet type check valve 66 and valve assembly body 67.

Other aspects, objects and advantages of this invention can be obtained from a study of the drawings, the disclosure and the appended claims.

What is claimed is:

1. A valve assembly comprising:

a housing defining an inlet and an outlet;

a poppet valve slideably disposed within the housing and being operable to control a flow of fluid between said inlet and said outlet;

a pressure chamber defined between said housing and said poppet valve and being structured and arranged to receive fluid directed therein from said inlet, wherein movement of said poppet valve being dampened by said fluid in said pressure chamber; and said poppet valve including at least one guiding portion in slideable engagement with at least one guiding portion of said housing, wherein said poppet valve and said housing are configured to provide a sliding relationship therebetween over an entire range of movement of said poppet valve.

2. A valve assembly as in claim 1 wherein said housing includes a first fluid passage to establish fluid communication between said inlet and said pressure chamber.

3. A valve assembly as in clam 2 wherein said first fluid passage includes a damper orifice that operates to restrict the flow of fluid between said pressure chamber and said inlet.

4. A valve assembly as in claim 3 wherein said first fluid passage includes a check valve disposed between said inlet and said pressure chamber that operates to allow the flow of fluid to freely enter said pressure chamber.

5. A valve assembly as in claim 4 wherein said first fluid passage includes a pressure relief valve to vent abnormally high fluid pressure from said pressure chamber.

6. A valve assembly as in claim 4 wherein said check valve is a poppet valve.

7. A valve assembly as in claim 3 including a second fluid passage establishing fluid communication between said inlet and said pressure chamber including a check valve disposed between said inlet and said pressure chamber that operates to allow the flow of fluid to freely enter said pressure chamber.

8. A valve assembly as in claim 7 wherein said check valve is a poppet valve.

9. A valve assembly as in claim 7 wherein said housing includes a second fluid passage having a pressure relief valve to relieve pressure within said pressure chamber.

10. A valve assembly as in claim 1 wherein said housing defines a control chamber disposed at an end of said poppet valve.

11. A valve assembly as in claim 10 wherein said poppet valve includes slots about a periphery of said poppet valve and internal passages that operate to establish fluid communication between said inlet and said control chamber.

12. A valve assembly as in claim 11 wherein a spring is disposed in said control chamber to urge said poppet valve against a valve seat disposed within said housing and positioned between said inlet and said outlet.

13. A valve assembly as in claim 12 including a flow regulating fluid passage establishing fluid communication between said control chamber and said outlet and a variable orifice pilot valve.

14. A valve assembly as in claim 1, wherein said at least one guiding portion of said housing is a shoulder and said at least one guiding portion of said poppet is a shoulder.

15. A valve assembly as in claim 14 wherein said shoulder of said housing has an inner diameter cooperating with said shoulder of said poppet valve to maintain axial alignment between said poppet valve and said housing.

16. A valve assembly as in claim 15 wherein said housing has a guide length and a guide inner diameter, and a ratio between said guide inner diameter and said guide length is constant for any poppet valve position.

17. A valve assembly as in claim 14, further comprising a second guiding portion of said poppet comprising a guide extension and a second guiding portion of said housing defined by said outlet of said housing.

18. A valve assembly as in claim 17 wherein said guide extension extends from a seat defined by said poppet valve and into said outlet.

19. A valve assembly as in claim 18 wherein said guide extension includes slots operative to direct fluid flow between said inlet and said outlet through said slots.

* * * * *